UNITED STATES PATENT OFFICE.

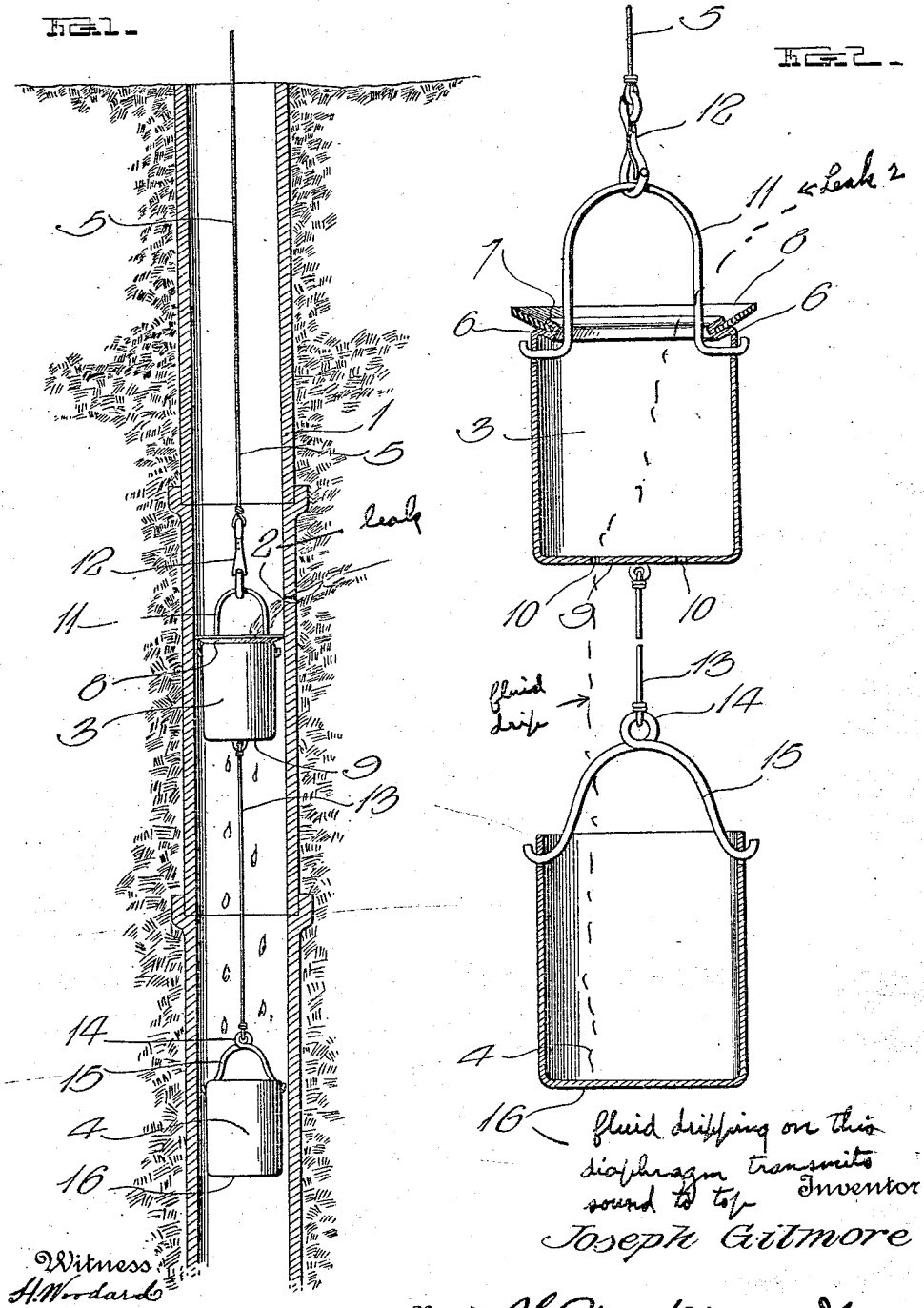

JOSEPH GILMORE, OF MEAD TOWNSHIP, WARREN COUNTY, PENNSYLVANIA.

LEAK-DETECTOR FOR OIL-WELL CASINGS.

1,200,722.  Specification of Letters Patent.  Patented Oct. 10, 1916.

Application filed January 3, 1916. Serial No. 70,006.

*To all whom it may concern:*

Be it known that I, JOSEPH GILMORE, a citizen of the United States, residing at Mead township, in the county of Warren and State of Pennsylvania, have invented certain new and useful Improvements in Leak-Detectors for Oil-Well Casings; and I do declare the following to be a full, clear, and exact description of the invention, such as will enable others skilled in the art to which it appertains to make and use the same.

My invention is an improved device for detecting leaks in oil well casings, the object of the invention being to provide a contrivance of this class having an alarm operated automatically when lowered into the casing to the level of a leak therein.

With this general object in view, the invention resides in certain novel features of construction and in unique combinations of parts to be hereinafter fully described and claimed, the descriptive matter being supplemented by the accompanying drawing which constitutes a part of this specification and in which:—

Figure 1 is a side elevation of the improved device showing its application to use in an oil well casing; and Fig. 2 is an enlarged vertical section of the dam and signaling members.

In specifically describing the construction shown in the drawings above briefly described, similar characters will be placed on corresponding parts throughout the several views and reference will be herein made to the numerous elements by their respective indices. To this end, the numeral 1 designates the usual cylindrical casing of an oil well, such casing being adapted to prevent the entrance of water into the well proper. It often happens, however, that leaks such as that illustrated at 2 in Fig. 1 occur, thereby allowing water to enter the well. It is to discover the location of these leaks that the present invention is designed. In the attainment of this end, I provide a dam member 3 and a signaling member 4 adapted to be lowered into the casing 1 by a metal measuring line or the like 5, said dam member being designed to check the downward flow of water from the leak 2 and to cause it to drip upon a diaphragm carried by the member 4. Since all parts of the device are formed of vibratory metal, the sound caused by this dripping of water will be transmitted to the upper end of the well, thus signifying that the device has been lowered to the level of the leak. By reference to the measuring line 5, the operator may now ascertain exactly the amount of casing to be removed in order to repair the damaged part thereof.

The member 3 is shown in the form of a metallic cylinder open at its upper end and having said end bent first inwardly at 6 to form an annular internal flange, the latter being then bent upward and outwardly to form an additional annular flange 7, a pliable packing ring 8 having its inner edge clamped between the two flanges as seen clearly in Fig. 2, said ring being adapted to lightly contact with the casing 1 as the device is lowered therein. The lower end of the cylinder forming the member 3 is closed by a bottom 9 having perforations 10 disposed at eccentric points. The line 5 may be connected in any preferred manner to the member 3, but the latter is preferably provided with a bail 11 to which said line is detachably connected by a snap hook or the like 12.

Secured to the center of the bottom 9 in any preferred manner, is the upper end of a supplemental metallic line 13, the lower end of said line being shown as secured to an eye 14 at the crown of a bail 15 which rises from the member 4. This member is shown in the form of a metallic cylinder having an open upper end, while its lower end is closed by a solid bottom 16, constituting a diaphragm to be vibrated by dripping of water from the perforations 10.

When using the device, it is lowered by means of the line 5 into the casing 1 and the moment the packing ring 8 reaches a level slightly below a leak 2, the downward flow of water from such leak will be checked, the result being that this water will drip slowly from the perforations 10 into the member 4 onto the diaphragm 16 of the latter, said diaphragm being thus vibrated. Obviously, since the entire apparatus is constructed of vibratory metal, sound vibrations will now be transmitted from said diaphragm to the top of the well, thus allowing the operator to ascertain that the level of the leak has been detected. By now referring to the graduations on the line 5, he may ascertain the exact amount of casing to be removed, and with this information at hand, the trouble may be easily rectified.

From the foregoing description, taken in connection with the accompanying drawing, the construction, manner of operation and numerous advantages of the improved device will be readily understood without requiring a more extended explanation. In conclusion, however, I wish to state that although certain specific details have been shown for illustrative purposes, numerous changes may be made within the scope of the invention as claimed.

I claim:—

1. A leak detector for oil well casings comprising a suspending member to be lowered into the casing, and a signaling device on said suspending member adapted to be operated by falling water from a leak in the casing.

2. A leak detector for oil well casings, comprising a suspending member to be lowered into the casing, and a signaling diaphragm on said suspending member adapted to be vibrated by falling water from a leak in the casing.

3. A leak detector for oil well casings comprising a dam having a suspending member whereby it may be lowered into the casing to check the downward flow of water from a leak therein, said dam being constructed to allow water to drip therefrom, and an alarm operated by such dripping of water.

4. A leak detector for oil well casings comprising a dam having a suspending member whereby it may be lowered into the casing to check the downward flow of water from a leak therein, said dam being constructed to allow water to drip therefrom, and an alarm suspended from the dam and operated by such dripping of water.

5. A leak detector for oil well casings comprising a dam having a suspending member whereby it may be lowered into the casing to check the downward flow of water from a leak therein, said dam being constructed to allow water to drip therefrom, and a signaling diaphragm upon which such water is adapted to drip.

6. A leak detector for oil well casings comprising a dam having a suspending member whereby it may be lowered into the casing to check the downward flow of water from a leak therein, said dam being constructed to allow water to drip therefrom, and a signaling diaphragm spaced below and suspended from the dam whereby such water may drip thereon.

7. A leak detector for oil well casings comprising a vibratory cylinder having a suspending member whereby it may be lowered into the casing, said cylinder having an open upper end provided with an outstanding packing ring to yieldably engage the casing, while the lower end of said cylinder is closed and perforated to allow water to drip therefrom, a supplemental suspending member depending from the cylinder, and a signaling diaphragm on the lower end of said supplemental suspending member to be vibrated by dripping of water from the perforations in the lower end of the cylinder.

8. A leak detector for oil well casings comprising a vibratory cylinder having a suspending member whereby it may be lowered into the casing, said cylinder having an open upper end provided with an outstanding packing ring to yieldably engage the casing, while the lower end of said cylinder is closed and perforated to allow water to drip therefrom, a supplemental suspending member depending from the cylinder, a second vibratory cylinder on the lower end of said supplemental suspending member, said cylinder having an open upper end and a solid lower end to be vibrated by dripping of water thereon from the perforations in the bottom of the first named cylinder.

In testimony whereof I have hereunto set my hand in presence of two subscribing witnesses.

JOSEPH GILMORE.

Witnesses:
LEMUEL BRADDOCK SCHOFIELD,
LEAH B. MAIN.

Copies of this patent may be obtained for five cents each, by addressing the "Commissioner of Patents, Washington, D. C."